United States Patent [19]

Ferbeck et al.

[11] Patent Number: 4,588,977
[45] Date of Patent: May 13, 1986

[54] APPARATUS FOR DETECTING DEFLATION OF A GUIDE WHEEL TIRE OF A TRANSPORTATION VEHICLE

[75] Inventors: Daniel Ferbeck, Issy-les-Moulineaux; Jamuel Mimoun, Plaisir, both of France

[73] Assignee: MATRA, Paris, France

[21] Appl. No.: 437,554

[22] Filed: Oct. 29, 1982

[30] Foreign Application Priority Data

Nov. 4, 1981 [FR] France .............................. 81 20698

[51] Int. Cl.⁴ .............................................. B60C 23/00
[52] U.S. Cl. ...................................... 340/58; 73/146.5
[58] Field of Search ................. 340/58, 676, 905, 941; 73/146.5; 104/245, 247; 246/169 A

[56] References Cited

U.S. PATENT DOCUMENTS 3,668,624 6/1972 Spaulding ........................... 340/905
4,328,479 5/1982 Van den Broek et al. ........... 340/58

FOREIGN PATENT DOCUMENTS 1399657 9/1965 France .
2323138 9/1975 France .
2019073 10/1979 United Kingdom .

Primary Examiner—John W. Caldwell, Sr.
Assistant Examiner—Tyrone Queen
Attorney, Agent, or Firm—Larson and Taylor

[57] ABSTRACT

A transportation vehicle for a transit system has a supporting structure provided with wheels moving on parallel tracks and inflated tires in rolling contact with stationary guide bars for guiding the structure. An apparatus for providing an indication of deflated or flat rubber tire is provided on the roadway. It detects lateral offset of the support structure with respect to the tracks from a set position responsive to deflation of one tire. The sensors are connected to a circuit which provides an alarm when the amount of offset exceeds a predetermined value.

10 Claims, 4 Drawing Figures

APPARATUS FOR DETECTING DEFLATION OF A GUIDE WHEEL TIRE OF A TRANSPORTATION VEHICLE

BACKGROUND AND SUMMARY OF THE INVENTION

This invention generally relates to vehicles running on tracks of a roadway and carried by support structures provided with support wheels and with guide wheels located symmetrically with respect to stationary guide means and having tires running on the guide means. It more particularly relates to an apparatus for detecting deflation of one of the guide wheel tires.

The invention is particularly, but not exclusively, suitable for use in guided self-propelled vehicles of a mass transportation system having horizontal rubber wheels carried by the axles and rolling on a pair of guide bars or beams placed symmetrically with respect to a longitudinal midplane of the tracks, or on a single guide bar which they straddle: such vehicles are for example used in the VAL public transportation system at Lille, France.

Deflation of a guide wheel of such a vehicle should be detected without delay since, even if safety guide devices are provided, prolonged traveling on an insufficiently inflated or flat guide wheel tire may result in burst or fire or at least considerable disturbances in operation.

Different devices have already been suggested for providing an alarm signal if a guide wheel tire is deflated or flat. Some use a sensor carried by the wheel and which supplies a signal transmitted inductively to a receiver mounted on the body of the vehicle (French specification No. 1,399,657). The arrangement is complex since it requires a sensor and a transmission system on each tire-equipped wheel. Devices are also known for detecting the deflation of guide wheel tires which detect the deformations or stresses in the guide bars or in their support (French No. 2,323,138). They are complex and of limited reliability; they require an increased flexibility of the guide bars in detection zones, result in costly machining and local weakening of the guide bars.

It is an object of the invention to provide an improved apparatus for detecting the deflated or flat condition of normally inflated guide wheels. It is a more specific object to provide such an apparatus which is of moderate cost and sufficiently reliable.

For that purpose, there is provided an apparatus suitable for use in a mass transportation system comprising a roadway having parallel supporting tracks and stationary guide means parallel to said tracks and vehicles. Each vehicle is provided with a support structure having support wheels rolling on the tracks and guide wheels provided with inflated tires in rolling contact with the guide means of the roadway and symmetrically located with respect to the guide means. The apparatus for detecting deflation of any one of the tires includes sensor means for detecting lateral offset of the support structure with respect to the tracks from a set position and signal delivering means connected to the sensor means to provide a signal when the offset exceeds a predetermined value.

The approach to the problem used by the invention is different from those previously suggested. The apparatus has no movable or flexible element. There is no component of the apparatus on board the vehicles. It is based on the finding that the probability of simultaneous and symmetric deflation of two opposed guide wheels is extremely low.

The sensor means will typically be carried by the roadway and placed so as to detect movement of the support structure with respect to a component thereof, for example with respect to the guide means. To increase the amount of offset of the support structure in the event of deflation of a tire at detection locations, distributed along the tracks and provided with sensors, the guide means are arranged for imposing on the tires an increased transverse load at these locations. If the guide means comprise two parallel bars, load increase may be obtained by a local decrease in the distance between the two bars. If the guide means comprise a single bar which is straddled by the guide tires (as for instance in the transportation system described in British Patent Application No. 2,019,073), the load may be locally increased by thickening the bar. Anyway, if the left and right hand guide wheels are inflated substantially identically, there is no appreciable lateral offset of the support structure and guide wheels when passing across the zone where the bars are closed up or the single bar is of increased thickness. If on the other hand a tire is deflated or flat, the tires have differect stiffnesses and the support structure moves transversely until the horizontal forces applied to the guide wheels are balanced. The amount of offset of the support structure will depend on the amount of closing up or thickening.

This closing up or this thickening is of great advantage because, in the regular portion of the tracks, the amount of offset may be so low that it would not be possible to distinguish that offset from those resulting from normal free movements, particularly in bends, due to different causes (lack of uniformity of the tracks, braking forces, wind action, centrifugal force in a curve). The amount of required offset will be selected for avoiding excessive forces on the guide wheels and their supporting structure during normal operation. In practice, the closing up or thickening will be chosen so that the stresses which it causes do not exceed those met with in the curves of the tracks during normal operation. On the other hand, such closing up or thickening will be selected to cause an appreciable amount of offset, typically of the order of magnitude of one centimeter, should a wheel be flat.

A part of the supporting structure (or on members connected thereto) which is close to the rolling plane is preferably subjected to measurement. If the supporting structure is connected to the vehicle body for free yaw movement, measurement will take place at a point remote from the yaw axis. The sensor means will typically comprise at least one contactless displacement sensor, which may be associated with a circuit which supplies an alarm signal only when the signal supplied by the sensor exceeds a threshold. Since the part whose offset is detected is generally of metal, electromagnetic proximity sensors of a conventional type may be used.

The invention will be better understood from the following description of particular embodiments given by way of examples only.

SHORT DESCRIPTION OF THE DRAWINGS

Figure 2:
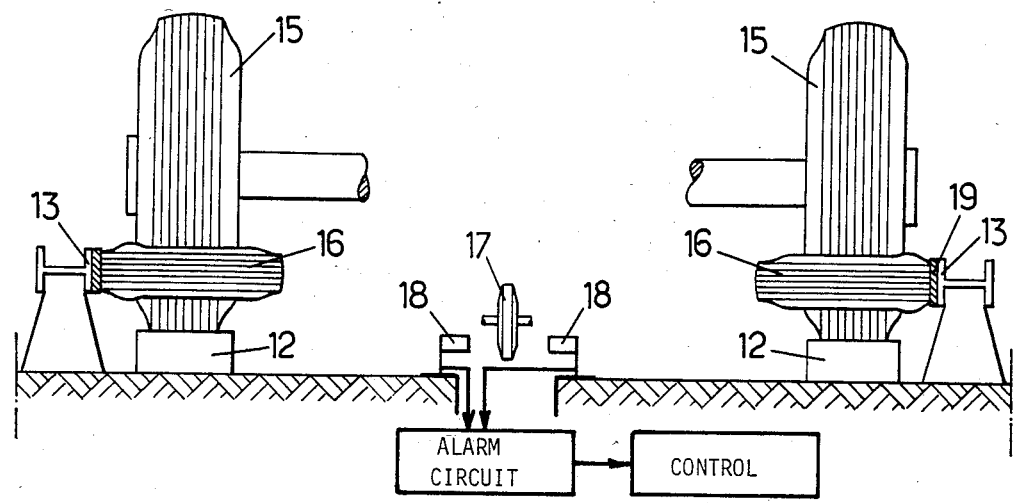
FIG. 2 is a simplified partial cross-section along line II—II of FIG. 1, showing a pair of sensors.
Figure 3:
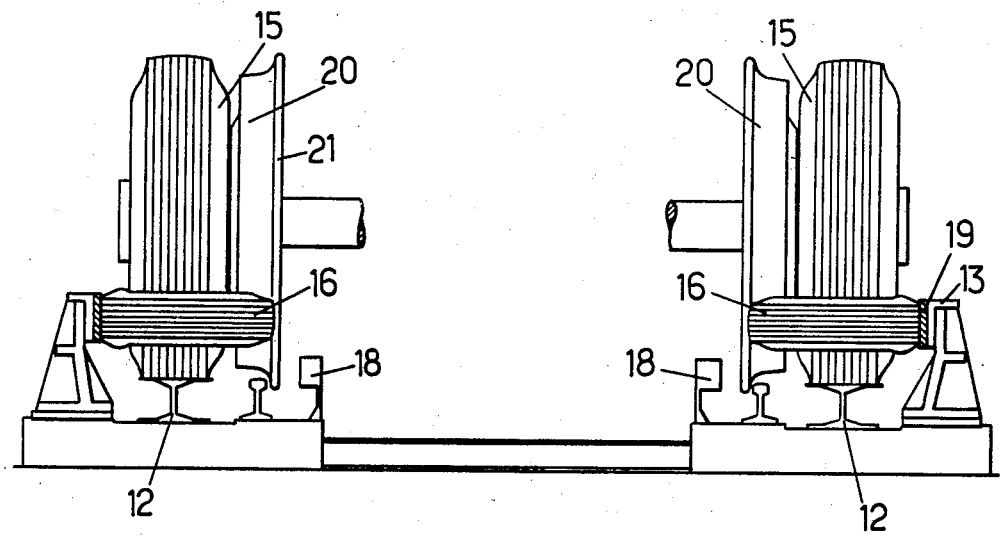
Figure 4:
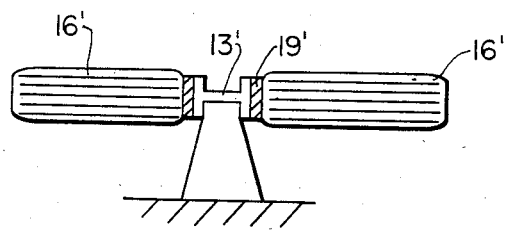

FIG. 3, similar to FIG. 2, illustrates a modified embodiment, for a system in which the guide tires are mounted on a bogie which comprises load-carrying wheels having inflated tires and safety metal sheels doubling the load-carrying wheels;

FIG. 4 is a diagrammatic elevation view of a portion of an embodiment in which the guide tires straddle a single bar.

DETAILED DESCRIPTION OF PARTICULAR EMBODIMENTS

Figure 1:
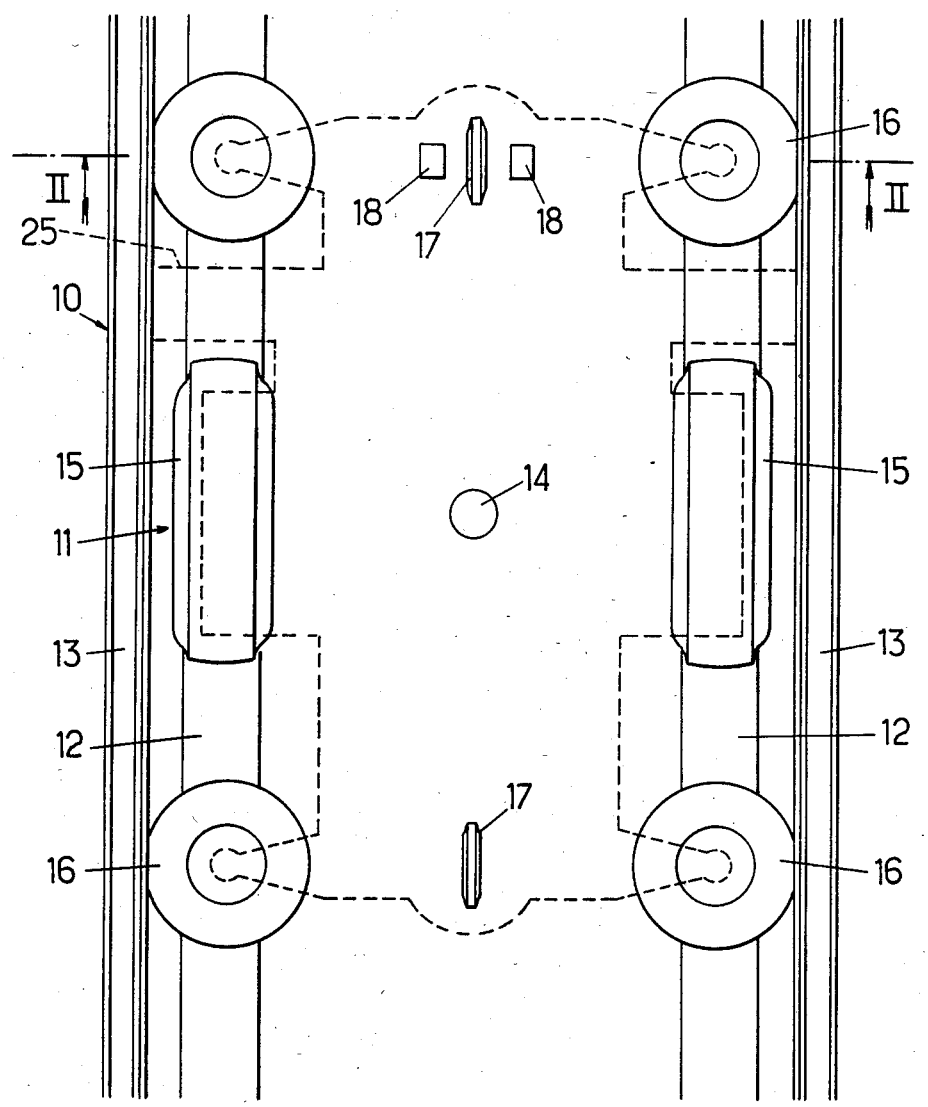
FIG. 1 is a simplified diagram showing an apparatus according to an embodiment of the invention for detecting the deflation of guide tire on a self steering axle unit having four rubber tired guide wheels, said apparatus having two rollers placed in the axis of the track.

Referring to FIGS. 1 and 2, there is illustrated a detection apparatus for a roadway 10 comprising two carrier tracks 12 and two parallel guide bars 13. The body of the vehicle travelling on the track (not shown) is supported by axle units. Axle unit 11 shown partially in FIGS. 1 and 2 has a pivot 14 (FIG. 1) rotatable on the body of the vehicle. The axle unit has two load-carrying tired wheels 15 which bear on the rails 12. The wheel shaft is rotatably supported by a supporting structure shown schematically (FIG. 1) in the form of a plate whose four corners are provided with horizontal guide wheels 16 equipped with inflated tires which bear against guide bars 13. Wheels 16 provide guidance in the current part of the roadway. The guide means are completed by two rollers 17, connected to the structure by rigid means (not shown) for guiding the vehicle in the roadway equipment and more especially in switches.

Detection means for detecting transverse offset of rollers 17 caused by deflation of a guide tire comprise, at a plurality of locations distributed along the roadway, proximity sensors 18. Since the rollers 17 are generally of metal, the sensors may be electromagnetic. To increase the amount of transverse displacement caused by deflation, the bearing surfaces of bars 13 are closer together in the zones where sensors 18 are placed. Closing up may be achieved by locally placing, on guide bars of constant cross-section, flat metal strips 19 of appropriate thickness or by bending the guide bars. Sensors 18 are associated with an electronic circuit supplying an alarm signal when the actual distance between roller 17 and a sensor is lower than a set distance by a value greater than a predetermined threshold. Such threshold corresponds to a predetermined amplitude of the signal supplied by a sensor or to a predetermined difference between the signals supplied by the two sensors 18.

An apparatus for a transit system may have the following characteristics. The two sensors 18 of electromagnetic type are placed opposite the guide rollers 17 at a nominal distance of 28 mm from the rollers. Each of the guide bars 13 have a thickness which is increased by 10 mm in the zones where the sensors are located. The distance between the bars is consequently decreased from 2130 to 2110 mm. When all guide tires are at nominal pressure, there is no detection signal.

When a guide wheel is deflated, the lateral displacement of the corresponding axle results in an amount of movement of the rollers of from about 10 to 20 mm since the rollers are situated at those points in the supporting structure which are most remote from the axis of rotation 14. That displacement of 10 to 20 mm is detected by that electromagnetic sensor which is disposed on the same side as the deflated wheel.

As mentioned above, the guide means may comprise a single bar 13' (FIG. 4) straddled by the guide tires 16'. The guide bar may be thickened in the detection located by metal strips 19'.

In the embodiment shown in FIG. 3 (where the parts corresponding to those in FIG. 2 are designated by the same reference numerals), the vehicle has bogies with two axle units. The load-carrying wheels 15 provided with tires are doubled by metal wheels 20 intended to ensure safety should deflation occur. Sensors 18 are then placed to detect change in the lateral position of the flange 21 of the metal wheels. Here again, contactless sensors may be used responsive to a change in the physical position of about one centimeter. That arrangement would also apply if displacement of any metal part of the bogie other than the flange is detected.

In both cases, the sensors may be DB 51 CPF proximity sensors from BALOGH, mounted on levelling supports secured to the roadbed. The sensors may confront (FIG. 1) or may be offset in the longitudinal direction and possibly doubled so as to ensure redundancy. A shielded cable may be used to connect each sensor to a circuit box for connection to a control cabinet; the latter may comprise alarm means and/or means for stopping the vehicle in response to a detection signal coming from any one of the detectors (OR function) or from several (AND function) for avoiding false alarms.

We claim:

1. In a mass transportation system comprising a roadway having parallel supporting tracks and stationary guide means parallel to said tacks and at least a vehicle provided with a support structure having support wheels for rolling movement on said tracks and having guide wheels provided with inflated tires which are in rolling contact with said guide means and are symmetrically located with respect to said guide means, an apparatus for detecting deflation of any one of said tires including sensor means for detecting lateral offset of the support structure with respect to the tracks from a set position and signal delivering means connected to said sensor means to provide an alarm signal when the amount of offset exceeds a predetermined value.

2. Apparatus according to claim 1, wherein said sensor means are supported by said roadway and placed to detect movement of the support structure with respect to said guide means.

3. Apparatus according to claim 1, wherein said guide means are arranged for imposing on said tires an increased transverse load at the locations of said sensor means.

4. Apparatus according to claim 3, wherein said guide means comprise two parallel bars and load increase is obtained by locally decreasing the distance between the two bars.

5. Apparatus according to claim 3, wherein said guide means comprise a single bar which is straddled by said guide tires and the load is locally increased by locally thickening said bar.

6. Apparatus according to claim 1, wherein said structure comprises an axle unit rotatable about a yaw axis with respect to a body of said vehicle, said structure has guiding rollers and said sensor means are located on said roadway for detecting lateral offset of said rollers with respect to a normal position due to occurence of a flat tire.

7. Apparatus according to claim 1, wherein said structure comprises a bogie, said supporting wheels include metal wheels and said sensor means are located for detecting offset of a flange of each said wheel due to occurence of a flat tire.

8. Apparatus according to claim 7, wherein said metal wheels constitute safety wheels associated with inflated wheels for normally supporting the structure, each said metal wheel being of a diameter slightly smaller than the normally inflated associated support wheel.

9. Apparatus according to claim 1, wherein said structure is pivotally connected to a body of said vehicle about a vertical axis and said sensor means are located and arranged for detecting offset movement of an element of said structure which is close to said roadway and which is remote from the pivotal axis of said structure.

10. Apparatus according to claim 1, wherein said sensor means include contactless sensors.

* * * * *